(12) United States Patent
Craddock et al.

(10) Patent No.: US 8,183,975 B2
(45) Date of Patent: May 22, 2012

(54) MINIATURE PRESSURE TRANSDUCER

(75) Inventors: Russell Craddock, Leicestershive (GB); James Anthony King, Leicestershire (GB)

(73) Assignee: GE Infrastructure Sensing, Inc., Billerica, MA (US)

( * ) Notice: Subject to any disclaimer, the term of this patent is extended or adjusted under 35 U.S.C. 154(b) by 312 days.

(21) Appl. No.: 12/564,527

(22) Filed: Sep. 22, 2009

(65) Prior Publication Data

US 2010/0073123 A1     Mar. 25, 2010

(30) Foreign Application Priority Data

Sep. 22, 2008 (EP) .................................... 08164833

(51) Int. Cl.
*H01C 10/10* (2006.01)

(52) U.S. Cl. .................. 338/42; 338/2; 73/724

(58) Field of Classification Search .................. 338/2, 4, 338/13, 36, 42; 73/724, 715, 718, 754; 438/53; 257/419

See application file for complete search history.

(56) References Cited

U.S. PATENT DOCUMENTS

| | | | | |
|---|---|---|---|---|
| 5,062,302 A | * | 11/1991 | Petersen et al. | 73/754 |
| 5,294,760 A | * | 3/1994 | Bower et al. | 200/83 N |
| 5,295,395 A | * | 3/1994 | Hocker et al. | 73/721 |
| 5,614,678 A | * | 3/1997 | Kurtz et al. | 73/727 |
| 6,392,158 B1 | | 5/2002 | Caplet et al. | |
| 6,629,465 B1 | | 10/2003 | Maluf | |
| 2003/0056598 A1 | | 3/2003 | Kimura et al. | |

FOREIGN PATENT DOCUMENTS

| | | |
|---|---|---|
| EP | 0354479 A | 2/1990 |
| GB | 2107924 A | 5/1983 |
| WO | WO9727802 A | 7/1997 |

* cited by examiner

*Primary Examiner* — Kyung Lee
(74) *Attorney, Agent, or Firm* — GE Global Patent Operation; Mark A. Conklin

(57) ABSTRACT

A miniature pressure transducer is disclosed which is able to operate at high temperatures. The pressure transducer is provided on a substrate comprising an elongate silicon base portion with one or more contact areas formed at one end and a diaphragm formed at the opposite distal end. A plurality of piezoresistive elements are provided on the diaphragm, preferably in a Wheatstone Bridge arrangement, and connected to the contact areas using interconnects. The diaphragm extends across substantially the entire effective width of the elongate base portion providing a compact width while still maintaining a sensitive pressure sensing capability.

14 Claims, 4 Drawing Sheets

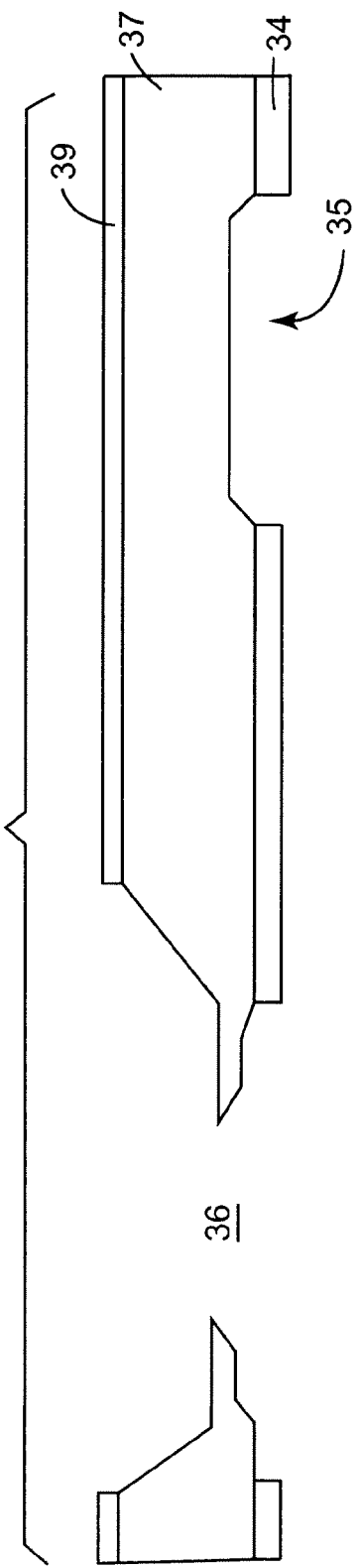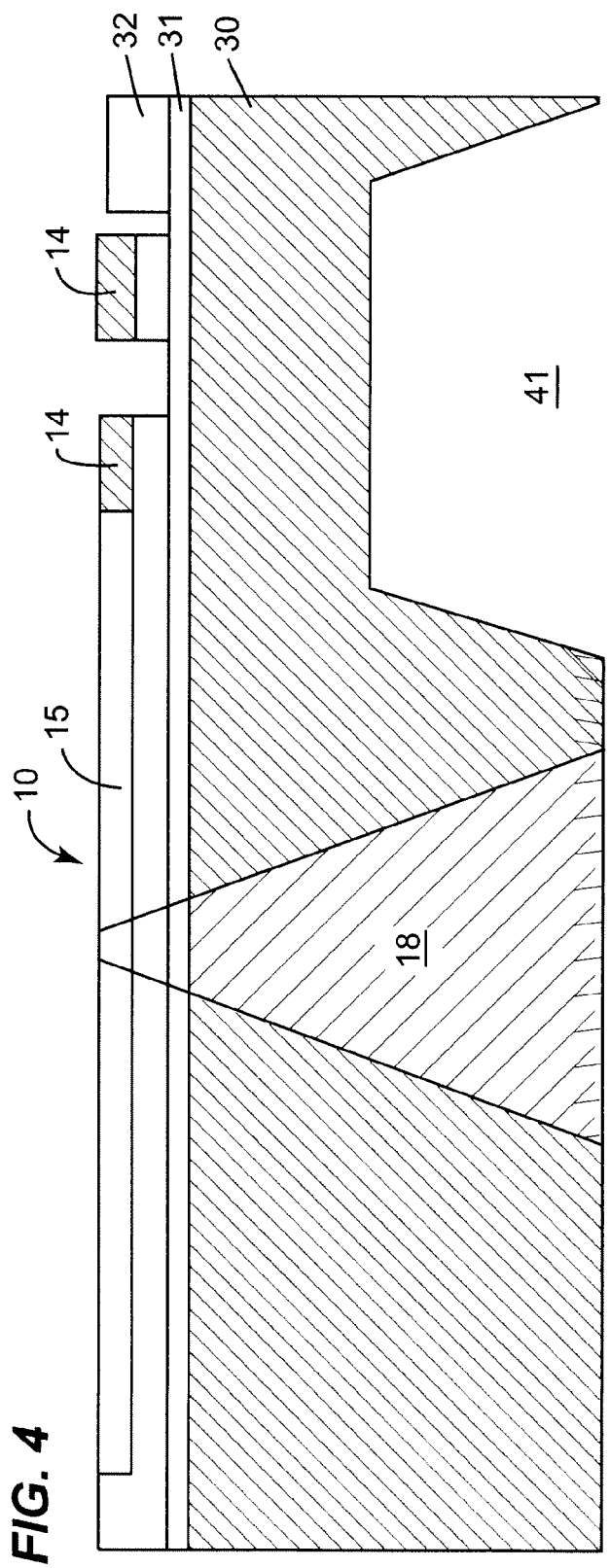

MINIATURE PRESSURE TRANSDUCER

FIELD AND BACKGROUND OF THE INVENTION

This invention relates to pressure transducers, in particular to miniature pressure transducers provided on a silicon wafer able to operate at high temperatures.

Pressure transducers etched or "micromachined" onto a silicon wafer are significantly smaller than conventional pressure transducers. Because of their small size, such micromachined pressure transducers are able to be used in situations that would be impractical for a conventional sensor such as, for example, in particular applications in the aereospace, medical or automotive industries.

U.S. Pat. No. 6,629,465 discloses the preparation of pressure transducers from a silicon wafer. Such sensors involve etching a cavity into a silicon wafer to expose a thin silicon diaphragm supported over a silicon frame. The silicon diaphragm may be exposed to a pressure to be measured and will flex in a predetermined manner depending upon the pressure to which it is exposed. The flexing of the diaphragm can be measured using piezoresistors formed on the diaphragm by processes such as implantation and/or diffusion. The piezoresistors will be electrically connected to suitable control circuitry, possibly via contacts typically arranged around the diaphragm.

It is desirable to further reduce the size of a pressure transducer, without reducing the size of the diaphragm which would reduce its sensitivity.

Furthermore, pressure sensors etched onto silicon wafers are generally limited by the temperature range at which they can operate. One reason for this is that semiconductor junctions of tracks and piezoresistors doped into the silicon produce significant leakage currents at increasing temperatures degrading the signals received from the piezoresistors.

In order to prevent fluid being tested from coming into contact with electrical leads and contacts of the transducer, the transducer is often provided inside a metal diaphragm with non-compressible packing material such as oil provided between the transducer and the metal diaphragm. However, such an arrangement is also limited by the temperature at which it can operate because at increasing temperatures the oil expands interfering with flexing of the diaphragm and reducing the precision of measurements produced. Furthermore, the silicon sensor is generally attached using an adhesive which cannot withstand the high temperatures, either failing in strength or outgassing reducing the precision in the oil filled package.

SUMMARY OF THE INVENTION

According to a first aspect of the present invention, there is provided a substrate for a pressure transducer, the substrate comprising:

an elongate base portion comprising silicon, the elongate base portion having one or more contact areas formed at one end and a diaphragm formed at the opposite distal end of the elongate length of the base portion;

a plurality of piezoresistive elements provided on the diaphragm and connected to the contact areas using interconnects; and wherein the diaphragm extends across substantially the entire effective width of the elongate base portion.

As the base portion is elongate and the diaphragm extends across substantially the entire effective width of the base portion at the distal end, with the contact areas formed at the opposite end of the base portion, the diaphragm is as large and thus as sensitive as it can be for that width of base portion. Consequently, a pressure sensor using this base portion will have a compact width without loss of pressure sensing capability. This is in contrast to conventional sensor substrates in which the diaphragm does not extend across substantially the entire effective width of the base portion, often due to the positioning of contact areas around the diaphragm.

The diaphragm may be formed by etching a cavity extending across substantially the entire effective width of the base portion with a side wall maintained on each side of the cavity. The cavity is preferably provided on the opposite surface of the base portion from that having the piezoresistive elements.

The piezoresistive elements and the interconnects are preferably arranged on an insulator provided on the silicon base portion. The provision of an insulating layer, such as silicon dioxide or sapphire for example, electrically isolates the sensing piezoresistors and interconnects such that the high temperature electrical leakage currents occurring in semiconductor junctions do not occur. The sensor is therefore able to be used at higher temperatures than would otherwise be possible.

In order to prevent fluid to be measured from coming into contact with the piezoresistive elements and interconnects, a protective layer, such as a silicon cap may be provided on top of them. The protective layer may for example be attached by silicon bonding or by attaching a glass frit. The fluid to be measured may then, in use, contact the back of the silicon diaphragm and the top of the silicon cap which are not electrically active.

In order to prevent fluid to be measured from coming into contact with the contact areas, wire bonds and cables, the substrate may be provided in a protective cover, such as a tube, with a seal provided between the substrate and the protective cover at a point along the elongate length of the base portion between the diaphragm and the contact areas. The protective cover and seal preferably have similar or substantially matched thermal expansion properties to the base portion comprising silicon, so that they may be used over a large range of temperatures without compromising the seal or causing excessive stress to the substrate. The protective cover, may for example, comprise titanium or Kovar and the seal may comprise a glass frit. Even if there is some stress produced in the base portion due to thermal mismatch during use, as the base portion is elongate with the diaphragm formed at the distal end, any stress in the area of the seal should not affect measurements at the diaphragm.

According to another aspect of the present invention there is provided a pressure transducer including a substrate according to the first aspect and a control device to be connected to the substrate via the contact areas to determine the pressure to which the diaphragm of the substrate is exposed in response to flexing of the diaphragm detected by the piezoresistive elements.

BRIEF DESCRIPTION OF THE DRAWINGS

Embodiments of the present invention will now be described, by way of example only, with reference to the accompanying drawings, in which;

FIG. 4 shows a side view of a substrate according to the present invention;

FIG. 5 shows a side view of a protective layer or cap; and

DETAILED DESCRIPTION OF THE INVENTION

Figure 1:
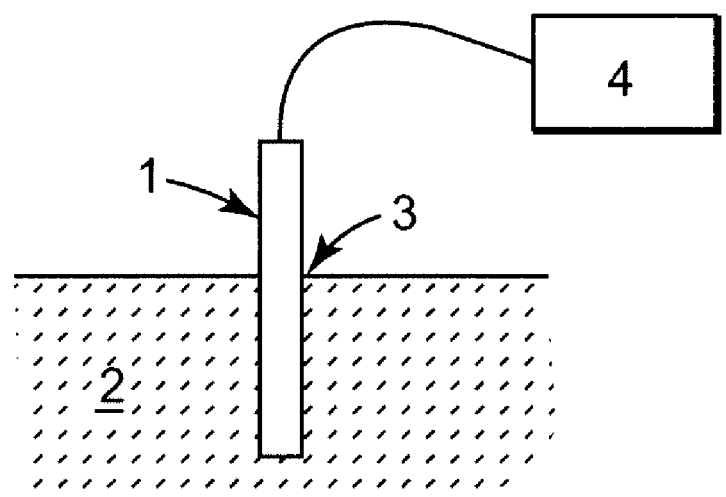
FIG. 1 schematically shows a pressure transducer including a substrate according to an embodiment of the present invention in use.

As can be seen in FIG. 1, a pressure transducer 1 including a substrate according to an embodiment of the present invention may be inserted into a fluid 2 so that the pressure of the fluid may be measured. The elongate base portion of the substrate enables elongate pressure transducers 1 to be produced which may be easily and conveniently inserted through access holes 3 into fluid. For example, a pressure transducer may be conveniently inserted through the wing of an aircraft to be brought into contact with fluid within the wing. The pressure transducer 1 may be used in many other situations such as to sense the pressure of fluids flowing through conduits or in reservoirs used in the automotive industry and many applications in the medical industry. The transducer 1 of FIG. 1 is connected to a suitable control device 4 such as a microprocessor to determine the pressure of the fluid 2 to which it is exposed.

Figure 2:
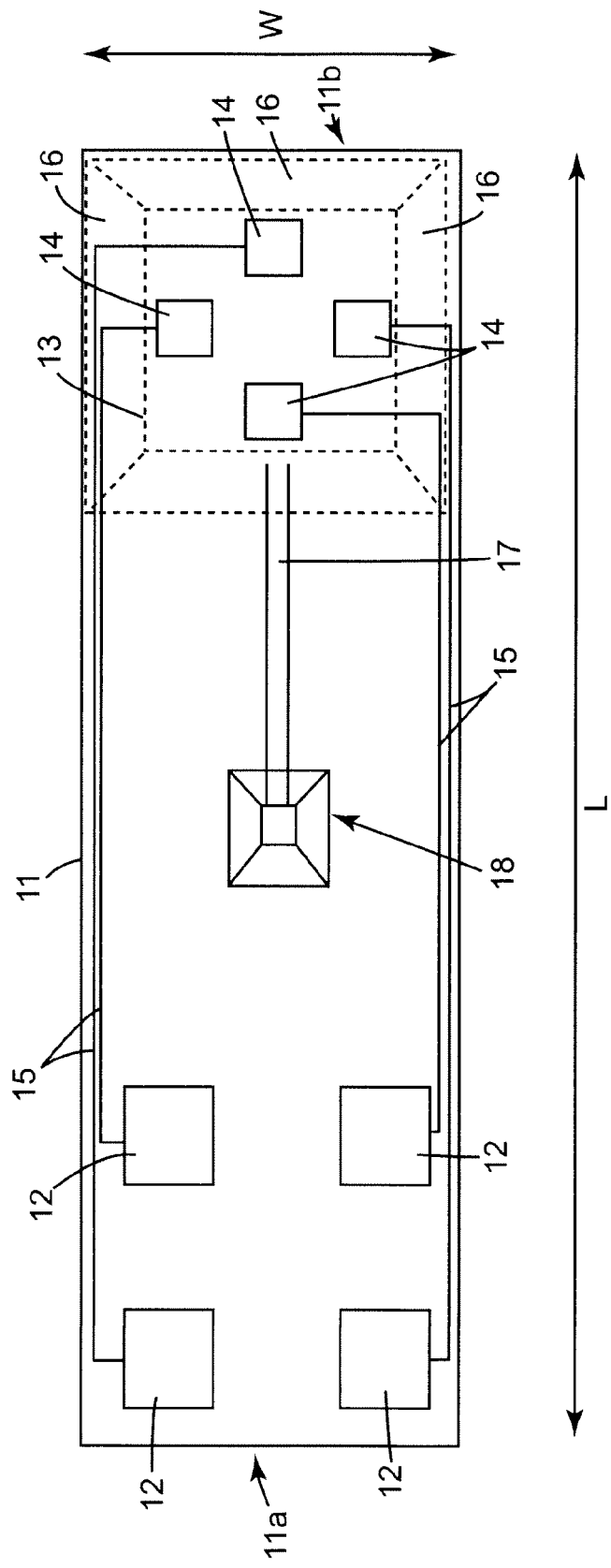
FIG. 2 schematically shows a top view of a substrate according to an embodiment of the present invention.

FIG. 2 schematically shows a top view of a substrate 10 which may be used in a pressure transducer 1 as shown in FIG. 1. The substrate 10 comprises an elongate base portion 11 with a length L, the elongate base portion comprising silicon. The elongate base portion 11 has contact areas 12 formed at one end 11a of the elongate base portion 11 and a diaphragm shown by dashed lines 13 formed at the opposite distal end 11b of the elongate length L of the base portion 11. A plurality of piezoresistive elements 14 are provided on the diaphragm 13. In this example four piezoresistive elements 14 are provided in a Wheatstone Bridge arrangement. Each piezoresistive element 14 is connected to a respective contact area 12 via an interconnect 15. Each contact area 12 is suitable for receiving an electrical connection to a control device 4. In this example, each interconnect 15 is an isolated highly doped track. As can be seen from FIG. 2, the diaphragm 13 extends across substantially the entire effective width W of the elongate base portion 11. Consequently, the base portion 11 has a compact width W making it very practical whilst still having a substantial sized diaphragm 13 to produce precise measurements. The diaphragm 13 may be formed by etching a cavity in the back of the base portion 11 as described in detail later. The cavity extends across substantially the entire effective width W of the base portion 11 with a side wall 16 provided on each side of the cavity.

The piezoresistive elements 14 and at least a portion of the interconnects 15 are provided on an insulating layer (see FIG. 4), typically of silicon dioxide or sapphire. Typically, the piezoresistive elements 14, all of the interconnects 15 and the contact areas 12 are provided on an insulating layer.

The diaphragm 13 flexes when it is exposed to pressure. The flexing is detected by the piezoresistive elements 14 which produce electrical signals which are input to the control device 4 via the interconnects 15 and contact areas 12. Additional components, such as amplifiers, filters etc may be provided and/or incorporated into the control device 4. The pressure of the fluid acting on the diaphragm 13 is determined based upon the signals received from the piezoresistive elements 14. The control device 4 typically determines the pressure to which the diaphragm 13 is exposed based upon pre-determined or pre-calibrated look-up tables, algorithms or the like as is well known in the art. The substrate 10 may also include a vent hole, in this example provided as a vent channel 17 and a via 18 for reference pressure to be applied to the internal surface of the diaphragm 13. This allows the provision of a gauge reference pressure sensor. The via hole 18 may be provided on either side of the substrate.

Figure 3:
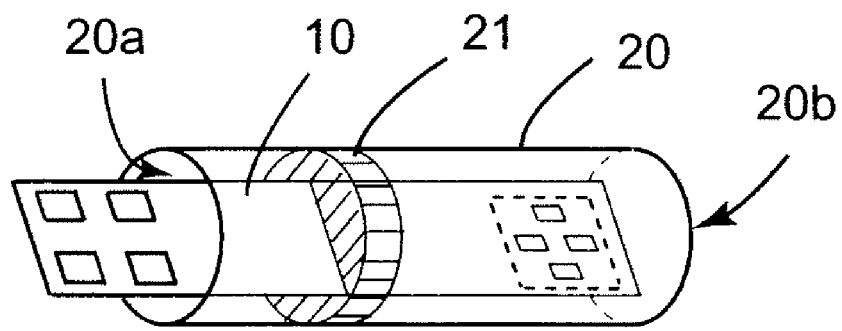
FIG. 3 shows the substrate of FIG. 2 provided in a protective cover.
Figure 6:
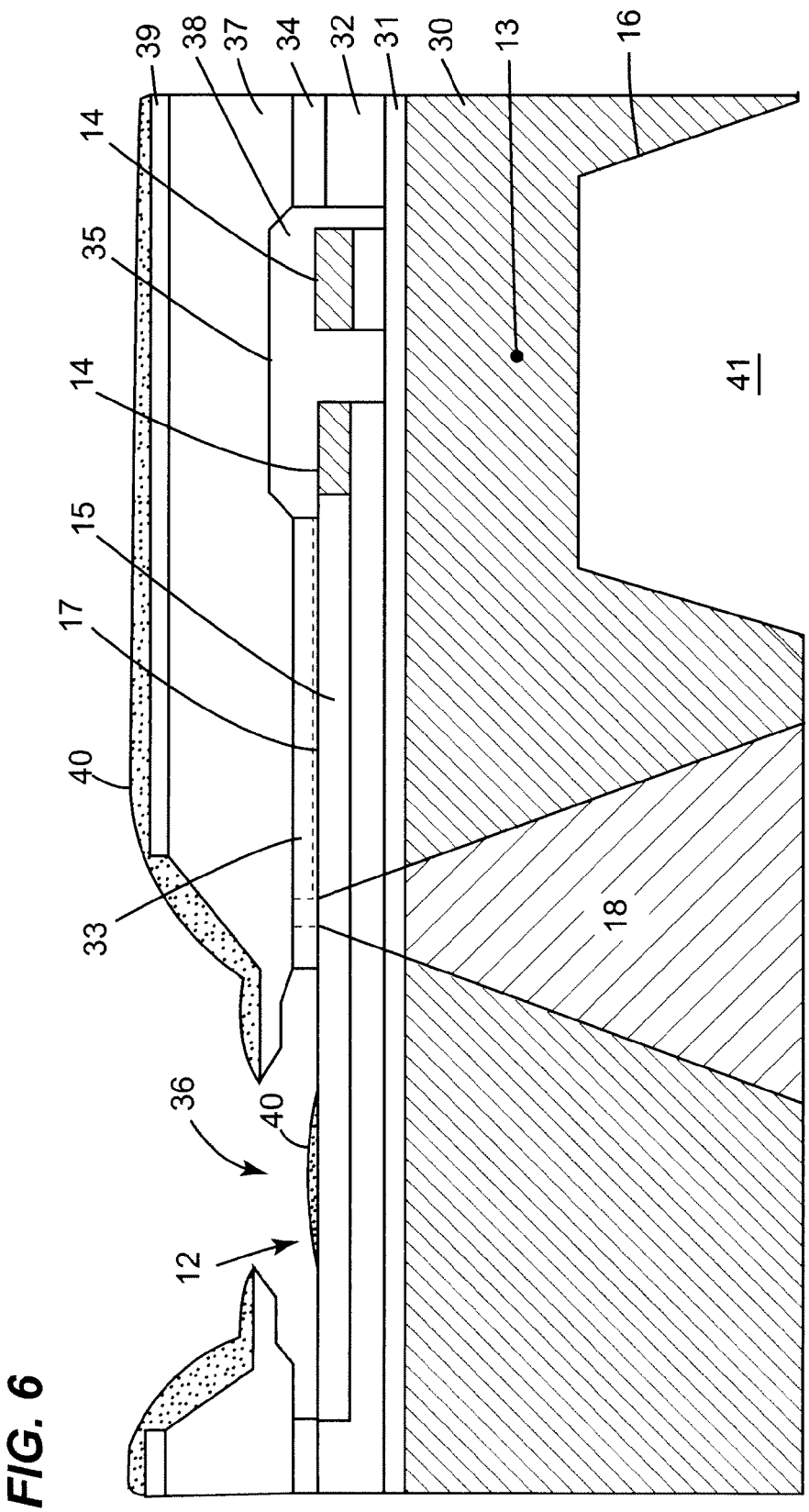
FIG. 6 shows the substrate of FIG. 4 and the cap of FIG. 5 bonded together.

FIG. 3 shows the substrate 10 of FIG. 2 provided in a protective cover 20, which in this example is a metal tube open at each end 20a, 20b. The opening 20b at the distal end of the protective cover 20 enables fluid to come into contact with the back of the diaphragm 13 and the top of the structure as shown in FIG. 6. A seal 21 is provided between the substrate 10 and the protective cover 20 along the elongate length of the base portion, between the diaphragm 13 and the contact areas 12. The seal 21 prevents fluid from passing through the pressure transducer and into contact with the contact areas 12.

The protective cover 20 and seal 21 are preferably made of materials with matched or similar thermal expansion properties to the silicon base portion 11 so that they expand and contract with changes in temperature without compromising the contact between the silicon base portion 11, seal 21 and cover 20 and without generating excessive stress in the base portion 11. The seal 21 may for example comprise a glass frit provided between the silicon base portion 11 and the protective cover 20. The protective cover may, for example, be made from titanium or Kovar. Any other suitable combination of materials may be used for the seal 21 and protective cover 20, but they would preferably have substantially matched linear thermal expansion coefficients with the silicon base portion 11. As the base portion 11 has an elongate length L with the diaphragm 16 at the distal end thereof, even if any stresses are produced in the base portion 11 due to thermal expansion mismatch of the seal 21 and cover 20, these stresses have no significant affect on the diaphragm 16 and its measurements.

FIG. 4 illustrates a fabricated silicon substrate 10. As shown in FIG. 4, a silicon wafer substrate 30 is provided which is typically cleaned prior to fabrication. An oxide insulating layer 31 is provided on top of the silicon wafer substrate 30 and another silicon layer 32 is provided on top of the oxide layer 31. Silicon layer 32 is patterned and etched to provide the interconnects 15 and piezoresistors 14. The interconnects 15 and piezoresistors 14 may be implanted or doped, typically with boron, before or after the top silicon layer 32 is etched.

FIG. 5 illustrates a cap wafer 37 to be bonded to the substrate 10. The cap wafer 37 may be prepared separately and hermetically sealed to the substrate 10, for example by being fusion bonded or glass frit bonded together.

The cap wafer 37 shown in FIG. 5 includes insulating oxide layers 34 and 39, typically comprising silicon dioxide. The insulating oxide layer 34 is provided on top of the piezoresistors 14 and interconnects 15, in use to provide electrical isolation from the subsequently bonded layers.

Silicon dioxide layers 34 and 39, which may include a silicon nitride layer, are patterned to form a mask for subsequent cavities in the silicon cap 37. A cavity, termed a cap cavity 35 is etched onto the silicon cap to provide a gap to allow for deflection of the diaphragm 13, in use. The cap 37 is etched to form an integrated silicon shadow mask 36 to create self alignment of a metal layer 40 as shown in FIG. 6. The contact areas are provided by deposition of the metal layer 40. An additional oxide layer may be required to further isolate the cap silicon layer 37 from the device layer which includes the interconnects 15 and the piezoresistors 14. The metal layer 40 may extend over the silicon cap 37. The contact area 12 can be formed of a metal stack 40 comprising a combination of titanium, tungsten, nitride and gold, for example.

The bonding of the substrate 10 to the cap 37 does not necessarily have to be performed last, and some of the etching of the shadow mask 36, vent via 18, or cavity 41 can be done either in preparation for bonding the two silicon wafers together, or after bonding the two together.

The cavity 41 is etched into the back surface of the silicon wafer substrate 30 to form the diaphragm 13 and side walls 16. The etched cavity 41 may be formed by KOH etching chemistry. If used, a via 18 may also be etched into the substrate or alternatively may be etched into the silicon cap 37.

The above described embodiments provides a stable, miniature pressure transducer capable of operating at high temperatures and over a large pressure range. They can be used as a differential or absolute transducer. The pressure transducer can be provided with a tubular cross section with a diameter of under 2 mm making it very convenient for many applications where conventional larger pressure transducers would not be suitable.

A pressure transducer in accordance with an embodiment of this invention may operate at temperatures up to at least 400° C. with long term stability and over a wide range of pressures, for example from 500 mbar to 2000 bar.

Many variations may be made to the examples described above without departing from the scope of the present invention. For example, the via 18 shown in FIGS. 4 and 6 need not be included if a reference pressure is not to be applied to the internal surface of the diaphragm. Furthermore, the substrate may not necessarily have a metal layer over the cap wafer 37 and outer oxide layer 39 as shown in FIG. 6 and various other modifications, additions or omissions may be made from the structure illustrated in the examples as will be appreciated by the person skilled in the art.

For example, instead of using a vent channel 17 and a via 18, the cap wafer 37 may be bonded in a vacuum such that the internal surface of the diaphragm is exposed to a vacuum providing a vacuum reference. This allows an absolute sensor to be created.

What is claimed is:

1. A substrate for a pressure transducer, the substrate comprising:
    an elongate base portion comprising silicon, the elongate base portion having one or more contact areas formed at one end and a diaphragm formed at the opposite distal end of the elongate length of the base portion;
    a plurality of piezoresistive elements disposed proximate each edge of the diaphragm and connected to the contact areas using interconnects, the plurality of piezoresistive elements generating electrical signals in response to flexing of the diaphragm, the combination of the electrical signals reflecting changes in pressure that occurs below the diaphragm; and
    wherein the diaphragm extends across substantially the entire effective width of the elongate base portion.

2. The substrate according to claim 1, wherein the diaphragm comprises a cavity in the base portion with a side wall on each side of the cavity.

3. The substrate according to claim 1, wherein the piezoresistive elements are arranged on an insulator provided on the silicon base portion.

4. The substrate according to claim 1, wherein a protective layer is bonded on top of the piezoresistive elements and interconnects.

5. The substrate according to claim 4, wherein a cavity is provided between the substrate and the protective layer and a vent hole is provided to connect a reference pressure to the cavity and an internal surface of the diaphragm.

6. The substrate according to claim 4, wherein the protective layer is bonded to the base portion to provide a hermetically sealed cavity therebetween.

7. The substrate according to claim 4, wherein the protective layer is arranged to provide an integrated shadow mask to allow self alignment of the contact areas.

8. The substrate according to claim 1, wherein the substrate is provided in a protective cover with a seal provided between the substrate and the protective cover at a point along the elongate length of the base portion, between the diaphragm and the one or more contact areas.

9. The substrate according to claim 8, wherein the protective cover is a tube.

10. The substrate according to claim 8, wherein the seal is separated from the diaphragm such that any stresses provided by contact between the seal and the substrate have no significant affect on the diaphragm.

11. The substrate according to claim 8, wherein the protective cover includes an opening to enable fluid to which it is exposed to contact the diaphragm.

12. The substrate according to claim 4, wherein the substrate is provided in a protective cover with a seal provided between the substrate and the protective cover at a point along the elongate length of the base portion, between the diaphragm and the one or more contact areas.

13. The substrate according to claim 12, wherein the bonded base portion and protective layer are hermetically sealed into the protective cover.

14. A pressure transducer comprising:
    a substrate comprising,
        an elongate base portion comprising silicon, the elongate base portion having one or more contact areas formed at one end and a diaphragm formed at the opposite distal end of the elongate length of the base portion;
        a plurality of piezoresistive elements disposed proximate each edge of the diaphragm and connected to the contact areas using interconnects, the plurality of piezoresistive elements generating electrical signals in response to flexing of the diaphragm, the combination of the electrical signals reflecting changes in pressure that occur below the diaphragm; and
        wherein the diaphragm extends across substantially the entire effective width of the elongate base portion; and
    a control device connected to the substrate via the contact areas to determine the pressure to which the diaphragm of the substrate is exposed in response to flexing of the diaphragm detected by the piezoresistive elements.

* * * * *